Nov. 12, 1929.　　　　J. BOREL　　　　1,735,725
ANTIGLARE HEADLIGHT FOR MOTOR CARS
Filed March 29, 1928

INVENTOR.
Joseph Borel
BY Frank G. Campbell
ATTORNEY.

Patented Nov. 12, 1929

1,735,725

UNITED STATES PATENT OFFICE

JOSEPH BOREL, OF ANNECY, FRANCE

ANTIGLARE HEADLIGHT FOR MOTOR CARS

Application filed March 29, 1928, Serial No. 265,605, and in France November 25, 1927.

The object of the present invention is to provide a new combination and correlation of parts, by virtue of which a maximum percentage of the light rays from an automobile headlight may be usefully employed in illuminating the road-bed, while, at the same time, preventing the projection of light rays above the horizontal, with the consequent objectionable glare so frequently present in headlights of this character.

Further objects and advantages of the invention will be set forth in the detailed description which follows.

Figure 1:
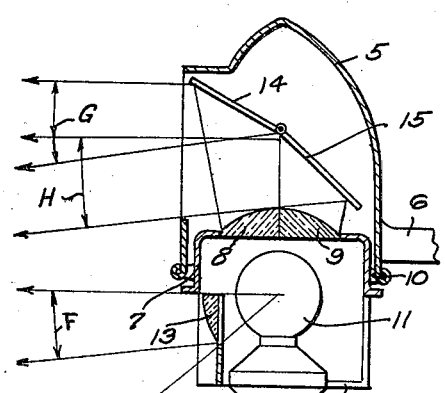
Figure 2:
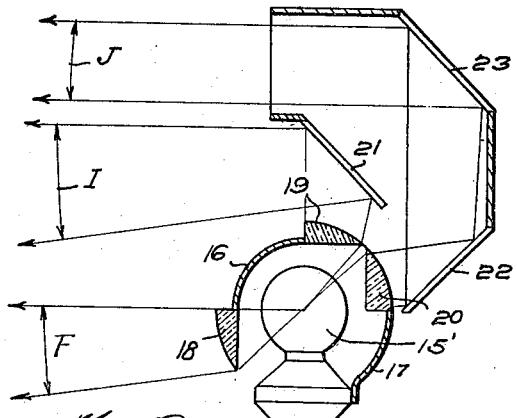
Figure 3:
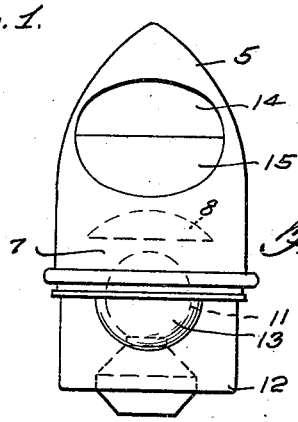
Figure 4:
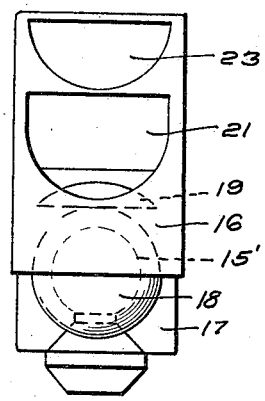
Figure 5:
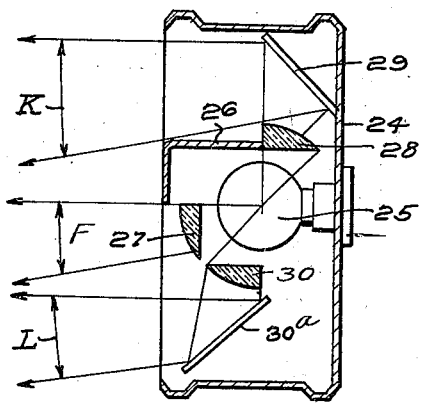
Figure 6:
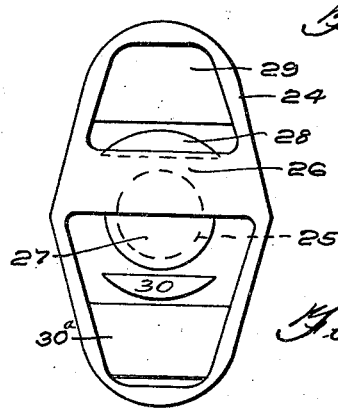

In the accompanying drawing:

Fig. 1 is a vertical sectional view of a headlight constructed in accordance with the invention, Fig. 2 is a diagrammatic vertical sectional view of a modified form of the invention, Fig. 3 is a front elevation of the structure of Fig. 1, Fig. 4 is a front elevation of a lamp embodying the principles of Fig. 2, Fig. 5 is a vertical sectional view illustrating a further modification of the invention, and Fig. 6 is a front elevation of the structure of Fig. 5.

Like numerals designate corresponding parts in all of the figures of the drawing.

It is desirable, in automobile headlight construction not to make the beam of light too narrow, but, upon the contrary, to light a fairly wide and deep zone. Where a lens, situated in front of a source of light, is employed to concentrate and direct the light rays, the rays may be divided into two categories, viz: those which pass through the lower half of the lens and which light the road for a certain distance without glaring, and the rays which pass through the upper half of the lens, and which entail the risk of creating glare or blinding the drivers of approaching vehicles, at certain distances.

In my earlier patents, I have eliminated these disadvantages by means of which, among other advantages, make glaring impossible, by disposing a hood over the source of light in such manner that the lower edge of the hood lies exactly in the horizontal plane passing through the center of the source of light, and by placing in front of the source of light a half lens which projects only the horizontal or slightly descending rays of light.

The object of the present invention is to further carry out this idea by combining with a structure of the character just described, certain novel arrangements of half lenses in combination with mirrors or other reflectors, the whole being so disposed that the maximum percentage of light rays may be captured and usefully projected on to the road-bed, while preventing the projection of rays above the horizontal, as previously outlined. Since certain of the rays usefully used, under the present invention, are rays which would be wholly useless if not employed as hereindescribed (such, for example, as those rays which would otherwise strike the top of the hood) it follows that the present invention represents a marked step forward in the art.

Referring to the drawing, and more particularly to Figs. 1 and 3, 5 designates the lamp housing carried by a supporting bracket 6, by which it may be supported from an automobile in the usual and known way. A hood 7 is located at the bottom of the housing 5, said hood being of inverted cup-shape and carrying in its top a pair of semi-plano convex lenses 8 and 9. The hood 7 is supported from the housing 5, at 10, and, in turn, supports a source of light, such as the electric lamp 11, through the medium of the hanger strip or frame 12. This frame also supports a semi-plano convex lens 13. The center of the light source is in the horizontal plane of the lower edge of the hood 7, and, consequently, no rays above the horizontal may pass directly outward from said light source. The rays from the lower forward portion of the light source are collected by the lens 13 and projected forward, (but none of them above the horizontal,) in beam F. The rays from the upper forward portion of the light source are collected by the half lens 8, and projected upon a mirror or reflector 14 that is located in the housing 5, and is disposed at such an angle as to reflect said rays forwardly in a beam G. The rays from the upper rear portion of the light source are condensed by lens 9, upon a mirror or reflector 15, also disposed in the housing 5, and are projected by said mirror forwardly in the form of a beam H. In addition, certain of the rays are reflected directly downward by the hood 7, upon the ground.

In the form of the invention illustrated in Figs. 2 and 4, the light source 15 is contained within a hood, having opaque portions 16 and 17, said hood carrying the semi-plano-convex lenses 18, 19 and 20. The lower forward edges of the opaque portion of the hood 16 is, at least, as low as the horizontal center of the light source, so that no direct forward rays above the horizontal may pass outwardly from said hood. In this arrangement, the lens 18 serves the same function as the lens 13, in Fig. 1. Lens 19 condenses the rays from the upper portion of the lamp upon a mirror or reflector 21, said reflector, in turn, projecting the rays forwardly in a beam I. The rays from the rear portion of the lamp are condensed by the lens 20, upon a reflector or mirror 22, by which said rays are, in turn, directed upon a second mirror or reflector 23, the latter projecting the rays forwardly in the form of a beam J.

In the form of the invention illustrated in Figs. 5 and 6, an opaque housing 24 contains a source of light, such as the electric bulb 25. An opaque hood 26 serves the same purpose in this structure that the hood 7 serves in Fig. 1, and hood 16 serves in Fig. 2. That is to say, its forward edge is disposed, at least, as low as the horizontal center of the light source. Lens 27, depending below the lower edge of the hood 26, serves the same purpose, in this structure, that the lenses 13 and 18 serve in Figs. 1 and 2, respectively. A semi-plano convex lens 28 condenses the rays from the upper rear portion of the light 25, upon a mirror or reflector 29, that is disposed in the housing 24, and this reflector projects these rays forwardly in beam K. The rays from the lower portion of the light 25 are condensed by the lens 30, upon a mirror or other reflector 30ª, which projects these rays forwardly in a beam L.

It will be apparent that many ways will readily suggest themselves to those skilled in the optical art of varying the position of the lenses and reflectors without departure from the basic principle involved, which is that of employing an opaque hood in conjunction with a source of light to prevent the direct forward passage of light rays above the horizontal and of capturing and condensing upon reflectors a large portion of the remaining and otherwise useless light rays, and disposing these reflectors at such angles as to cause them to project the captured rays forwardly in useful beams at or below the horizontal so that, although practically all of the light rays are usefully employed, there will be no resultant glare or dazzle.

Consequently, it is to be understood that the invention is not limited to the precise construction set forth, but that it includes within its purview whatever changes fairly come within either the terms or the spirit of the appended claims.

I claim:

1. A vehicle lamp comprising a light source, an inverted cup-shape opaque hood above said source and having its lower edge substantially in line with the center of the light source, a semi-plano-convex lens depending below the edge of the hood and condensing rays from the light source in planes below the horizontal, a mirror to one side of the axis of the light source, and inclined with respect to said axis, a semi-plano-convex lens between said mirror and light source to condense the rays received thereby on the mirror, a second mirror to the other side of the axis of the light source and inclined in relation to said axis of the light source, and to the first mirror, a second semi-plano-convex lens placed between the second mirror and the light source to condense the rays received thereby on the second mirror, both mirrors projecting the rays received by them in directions at and below the horizontal, the hood serving to prevent the direct outward passage of rays upwardly.

2. A vehicle lamp comprising a light source, an inverted cup-shape opaque hood above said source and having its lower edge substantially in line with the center of the light source, a semi-plano-convex lens depending below the edge of the hood and condensing rays from the light source in planes below the horizontal, a mirror to one side of the axis of the light source, and inclined with respect to said axis, a semi-plano-convex lens between said mirror and light source to condense the rays received thereby on the mirror, a second mirror in rear of the first mirror, and inclined in relation to said axis of the light source, and to the first mirror, a second semi-plano-convex lens placed between the second mirror and the light source to condense the rays received thereby on the second mirror, the hood serving to prevent the direct outward passage of rays upwardly.

3. A vehicle lamp comprising a light source, an inverted cup-shape opaque hood above said source and having its lower edge substantially in line with the center of the light source, a semi-plano-convex lens depending below the edge of the hood and condensing rays from the light source in planes below the horizontal, a mirror to one side of the axis of the light source, and inclined with respect to said axis, a semi-plano-convex lens between said mirror and light source to condense the rays received thereby on the mirror, a second mirror to the other side of the axis of the light source and inclined in relation to said axis of the light source, and to the first mirror, a second semi-plano-convex lens placed between the second mirror and the light source to condense the rays received thereby on the second mirror, both mirrors projecting the rays received by them in directions at and below the horizontal, the hood serving to prevent the direct outward passage of rays upwardly, and a housing in which both of said mirrors and said hood are contained, said housing having an open side through which the rays condensed upon the mirrors by the lenses are reflected from the mirrors.

JOSEPH BOREL.